(12) United States Patent
Haeusler et al.

(10) Patent No.: US 7,950,727 B2
(45) Date of Patent: May 31, 2011

(54) SUSPENSION MEANS WITH SCISSOR PANTOGRAPH

(75) Inventors: Felix Haeusler, Osnabrück (DE); Holger Lohmüller, Vehrte (DE); Knut Heidsieck, Bünde (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 740 days.

(21) Appl. No.: 11/917,358

(22) PCT Filed: Jun. 16, 2006

(86) PCT No.: PCT/DE2006/001038
§ 371 (c)(1),
(2), (4) Date: Dec. 13, 2007

(87) PCT Pub. No.: WO2007/000133
PCT Pub. Date: Jan. 4, 2007

(65) Prior Publication Data
US 2009/0309280 A1    Dec. 17, 2009

(30) Foreign Application Priority Data

Jun. 29, 2005  (DE) .......................... 10 2005 030 746

(51) Int. Cl.
*B62D 33/10* (2006.01)
(52) U.S. Cl. .................. 296/190.07; 248/560
(58) Field of Classification Search .................. 248/560, 248/618; 296/190.07; 267/256, 257
See application file for complete search history.

(56) References Cited

U.S. PATENT DOCUMENTS

| | | | | | |
|---|---|---|---|---|---|
| 3,102,721 | A | * | 9/1963 | Linville | 267/160 |
| 3,501,120 | A | * | 3/1970 | Daniel, Jr. | 248/277.1 |
| 3,774,711 | A | | 11/1973 | Lacey | |
| 4,558,648 | A | * | 12/1985 | Franklin et al. | 108/147 |
| 5,253,853 | A | | 10/1993 | Conaway et al. | |
| 5,598,591 | A | | 2/1997 | Kelley | |
| 5,967,494 | A | * | 10/1999 | Fiorese | 254/122 |
| 5,975,508 | A | * | 11/1999 | Beard | 267/136 |
| 6,168,229 | B1 | | 1/2001 | Kooi et al. | |
| 6,854,715 | B2 | * | 2/2005 | Hicks et al. | 254/122 |
| 7,413,056 | B2 | * | 8/2008 | Gonzi et al. | 187/269 |
| 7,695,054 | B2 | * | 4/2010 | Haeusler et al. | 296/190.07 |
| 2003/0146647 | A1 | | 8/2003 | Leitner et al. | |
| 2004/0069979 | A1 | * | 4/2004 | Hicks et al. | 254/122 |

FOREIGN PATENT DOCUMENTS

| | | |
|---|---|---|
| CN | 1 25 12 92 A | 4/2000 |
| DE | 21 65 626 C2 | 7/1972 |
| EP | 0 878 638 A2 | 11/1998 |
| EP | 0 995 924 A2 | 4/2000 |

(Continued)

*Primary Examiner* — Ramon O Ramirez
(74) *Attorney, Agent, or Firm* — McGlew and Tuttle, P.C.

(57) ABSTRACT

A suspension arrangement for spring suspending a mass body (3) in relation to a substructure (1), for example, a driver's cabin (3) of a heavy goods vehicle in relation to the vehicle chassis (1) thereof. The suspension arrangement comprises a spring/damper arrangement (2) which is arranged between the mass body (3) and the substructure (1) and which is used to dampen thrusts and/or oscillations. The suspension arrangement in characterized in that it comprises at least one pantograph (6) which is used to reduce the freedom of movement of the mass body (3). The inventive suspension arrangement is constructively robust and can determine the provided freedom of movement of the mass body in a reliable manner and can dampen and/or prevent undesired movements in other spatial directions. The invention enables an economical and a reliable spring suspension, in particular, for a driver's cabin of heavy good vehicles, to be produced.

15 Claims, 1 Drawing Sheet

FOREIGN PATENT DOCUMENTS

| | | |
|---|---|---|
| EP | 1 077 157 A2 | 2/2001 |
| GB | 1 440 686 | 6/1976 |
| WO | WO 98/57130 A1 | 12/1998 |
| WO | WO 2004/018243 A2 | 3/2004 |

* cited by examiner

SUSPENSION MEANS WITH SCISSOR PANTOGRAPH

CROSS REFERENCE TO RELATED APPLICATIONS

This application is a United States National Phase application of International Application PCT/DE 2006/001038 and claims the benefit of priority under 35 U.S.C. §119 of DE 10 2005 030 746 filed 29 Jun. 2005, the entire contents of which are incorporated herein by reference.

FIELD OF THE INVENTION

The present invention pertains to a suspension arrangement or device for the anti-vibration or shock-absorbing suspension of a mass body, especially a driver's cab of a truck, relative to a chassis, especially relative to a vehicle chassis. The suspension arrangement including a spring/absorber arrangement arranged between the mass body and the chassis for absorbing shocks and vibrations.

BACKGROUND OF THE INVENTION

Suspension arrangements of the type mentioned in the introduction are used, for example, but by no means exclusively, in trucks and similar heavy trucks in order to uncouple the driver's cab from the chassis of the vehicle. Since the spring rates of the chassis springs are inevitably relatively high in heavy trucks because of the heavy loads of the vehicles, unevennesses of the road surface or even vibrations from axles and the drivetrain are transmitted to a considerable extent to the chassis via the axle suspension.

Driver's cab suspensions, in which the driver's cab is supported with the use of a separate suspension system on the vehicle chassis, have been developed in order to minimize the transmission of such persistent shocks and vibrations to the driver's cab and hence to the workplace of the driver in the sense of ergonomics and occupational safety. Such suspension systems for the driver's cab can be designed with considerably lower spring rates and softer shock absorbers than the axle suspension thanks to the fact that the weight of the driver's cab is much lower than the weight of the vehicle.

However, such suspension arrangements for driver's cabs are of a relatively complicated design, especially if increased requirements are imposed on the support of lateral forces and kinematics, for example, pitch or roll suppression. It may thus possibly even be necessary to provide additional stabilizers, besides the spring and absorber elements proper, similarly to the axle suspensions of motor vehicles.

To limit, for example, the undesired, relative lateral roll of the driver's cab in relation to the chassis of the vehicle, for example, during travel on oblique surfaces or in curves, roll stabilizers in the form of torsion bars, which couple the spring compression paths of the suspension elements of the driver's cab, which are the left and right suspension elements relative to the direction of travel, with one another to a certain degree, are frequently necessary in suspension arrangement according to the state of the art. To additionally also suppress or absorb motions or vibrations of the driver's cab in the lateral direction, additional spring/absorber units are also often necessary in the transverse direction of the vehicle.

Such prior-art devices for suppressing rolling motions or for absorbing motions of the driver's cab in directions other than the principal shock directions are, however, of a complicated design, especially because of the high loads acting. Thus, they cause rather substantial costs in terms of both construction and production as well as in connection of the maintenance of trucks equipped therewith.

SUMMARY OF THE INVENTION

Against this background, the object of the present invention is to provide a suspension arrangement or device for the antivibration suspension of a mass body, with which the drawbacks of the state of the art can be overcome. In particular, the suspension arrangement shall make it possible to reliably set the desired degree of freedom of motion of the mass body with simple means and at the same time to effectively absorb or suppress undesired motions along other degrees of freedom of motion or directions in space.

This object is accomplished with a suspension arrangement having the features of a spring/absorber arrangement arranged between the mass body and the chassis for absorbing shocks and vibrations, and at least one scissor pantograph for reducing the degrees of freedom of motion of the mass body. Preferred embodiments are the subject of the subclaims.

The suspension arrangement according to the present invention can be used in known applications per se, for the antivibration suspension of a mass body relative to a chassis, i.e., for example, for the suspension of the driver's cab of a truck in relation to the chassis of the vehicle.

In a manner that is likewise known per se, the suspension arrangement comprises a spring/absorber arrangement arranged between the mass body and the chassis for absorbing shocks and vibrations of the chassis.

However, the suspension arrangement is characterized according to the present invention by at least one scissor pantograph for reducing the degrees of freedom of motion of the mass body. The scissor pantograph is arranged in the manner of a scissor lift arrangement between the chassis and the mass body such that the mass body can move along the desired degree of freedom of motion, or along the intended direction in space relative to the chassis, while the motion of the mass body along at least one other direction in space is absorbed or suppressed. In other words, the scissor pantograph is consequently used to reduce the number of degrees of freedom of motion of the mass body relative to the chassis.

The connection according to the present invention between the mass body and the chassis by means of a scissor pantograph is especially advantageous because straight-line motion of the mass body relative to the chassis can thus be achieved with a simple and robust design. However, for example, the so-called rolling or pitching motions—i.e., in other words, undesired rotary motions of the mass body about at least one of its principal axes—are at the same time effectively suppressed. This also applies to undesired, e.g., lateral motions of the mass body at right angles to the principal direction of shock or generally to motions taking place at right angles to the direction of the straight-line motion of the mass body.

The present invention is embodied independently from the manner in which the scissor pantograph is designed in the particular case and from how it is arranged between the chassis and the mass body. However, according to a preferred embodiment of the present invention, at least one of the movable bearings of the scissor pantograph is designed as an oscillating lever.

Scissor pantographs or the scissor lift arrangements known, for example, from lifting platforms, have, in general, a fixed bearing arrangement and a movable bearing arrangement each both in the area of the chassis and in the area of the platform supported, for example, with the scissor lift. The movable bearing arrangement is designed in the prior-art scissor lift arrangements in the form of a sliding block, which is guided slidingly in a straight-line motion, for example, in an elongated hole or in a rail.

However, this embodiment of the movable bearing has a complicated design, has a heavy weight and requires much maintenance and is prone to wear because of the sliding straight-line motion. However, as the applicant has found out, these drawbacks can be eliminated by designing at least one of the movable bearings and preferably both movable bearings of the scissor pantograph in the form of an oscillating lever. The oscillating lever has the advantage over sliding guiding with a sliding block and rail, in that the corresponding arm of the scissor pantograph can be connected to the corresponding articulation with the mass body and the chassis without the use of a linear guide, simply by means of drag bearings, which can be controlled in a simple manner by design measures.

A connection that is both robust and extensively maintenance-free, can be manufactured at a low cost and is almost free from clearance can be achieved in this manner between the chassis, the scissor pantograph and the mass body. In addition, the fact that the movable bearing arrangements are designed as oscillating levers helps reduce the weight and the space needed for the installation.

How the bearing points of the scissor pantograph are designed is at first irrelevant for the embodiment of the present invention as long as the loads to be expected can be absorbed. However, at least one of the bearing arrangements of the scissor pantograph or of the suspension arrangement is designed as an elastomer bearing according to a preferred embodiment of the present invention.

The design of one or more bearing arrangements or even of all bearing arrangements of the scissor pantograph as elastomer bearings has especially the advantage that the suspension arrangement can be made even more robust in this manner, and the maintenance requirement can be reduced at the same time to a minimum. Moreover, an additional vibration absorption is also achieved in this manner in the micro range, which reduces the loads acting on the bearings and the material and, especially in case of use in vehicles, additionally improves the comfort that can be attained with the suspension arrangement.

Finally, self-locking of the scissor pantograph, which occurs under certain installation conditions, for example, because of the cosine component of the pivoting motion of the movable bearings of the scissor pantograph, which are designed as oscillating levers, can be prevented by the use of elastomer bearings.

Provisions are made according to another embodiment of the present invention for the suspension arrangement to comprise not only one scissor pantograph but a plurality of scissor pantographs. A further improvement in the precision of guiding, higher stressability as well as an increase in safety, especially in case of use in vehicles, can thus be achieved, independently from the specific design and arrangement of the scissor pantographs.

In another, especially preferred embodiment, the plane spanned by the joints of one of the scissor pantographs is arranged at right angles to the plane spanned by the joints of another scissor pantograph. In other words, this means that at least two scissor pantographs are used, which are arranged in planes extending at right angles to one another. The degree of motion of freedom of the mass body can thus be limited with an especially high degree of safety and accuracy to motions along only one direction in space, whereas any motions along the other two directions in space are ruled out. Undesired rotations of the mass body about at least two axes of a cartesian system of coordinates, i.e., for example, both rolling motions and pitching motions of a driver's cab, can be reliably prevented in this manner from occurring.

According to another embodiment of the present invention, the suspension arrangement comprises, furthermore, at least one control arm, for example, a longitudinal control arm or a Panhard rod. The control arm is arranged at right angles to the plane spanned by the joints of a scissor pantograph.

An even better supporting of the forces that act at right angles to the plane spanned by the scissor pantograph or at right angles to the principal direction of motion of the mass body is achieved in this manner. In case of use in motor vehicles, this means, for example, better supporting of the strong longitudinal forces occurring in case of a crash by control arms arranged correspondingly lengthwise. However the transmission of the lateral forces acting in parallel to the axes of rotation of the bearing of the additional control arm between the mass body and the chassis can also be supported in this manner.

Provisions are made in another, especially preferred embodiment of the present invention for the entire suspension arrangement to be designed as a modular system. In other words, this means that the essential components of the suspension arrangement, especially the bearings and bars of the scissor pantograph, are designed as standard components that can be universally combined with one another. By selecting the particular, fitting standard components, a suspension arrangement with many different dimensions can thus be embodied in an especially simple manner and at an especially low cost, and the suspension arrangement can be used, for example, for many different vehicle sizes or vehicle categories or even for compensating connection tolerances that may occur without appreciable design modifications.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
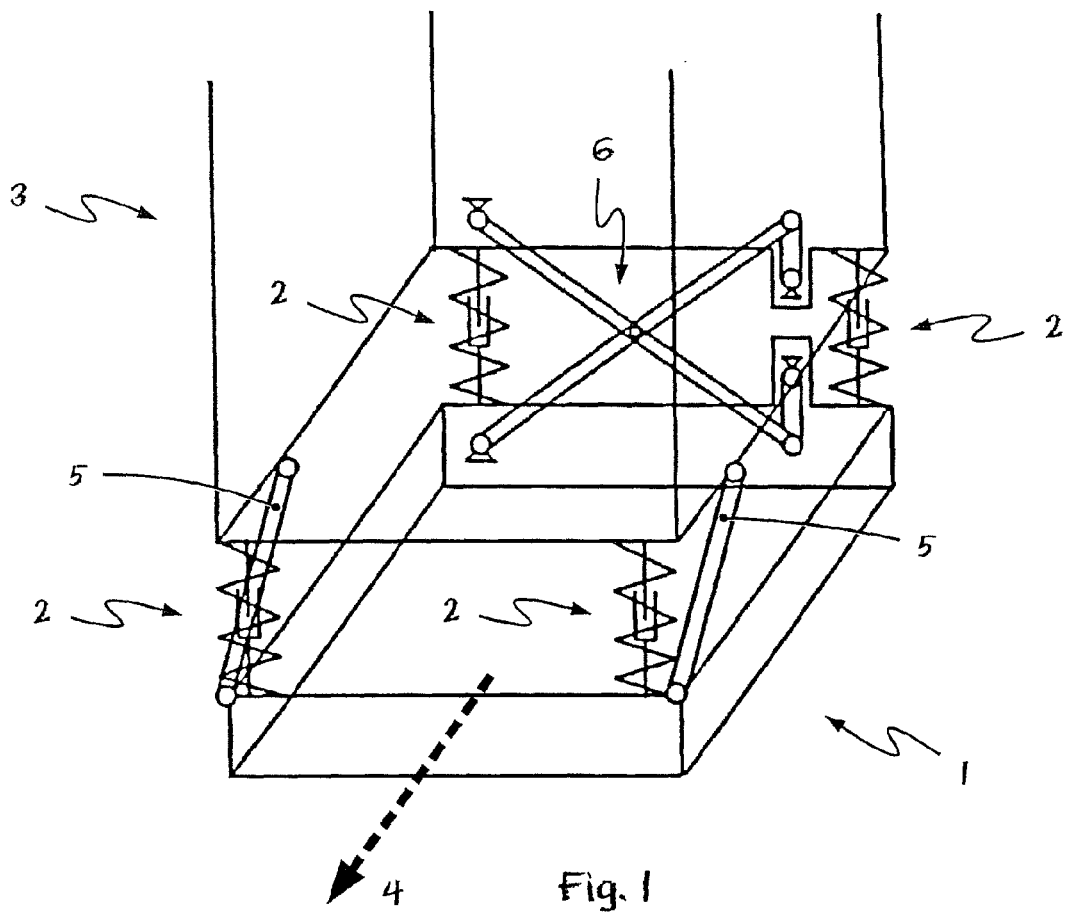
FIG. 1 is a schematic isometric view of an embodiment of a suspension arrangement according to the present invention.

Referring to the drawings in particular, FIG. 1 shows a highly schematic isometric view of an embodiment of a suspension arrangement according to the present invention. A chassis 1 and a schematically indicated mass body 3 connected to the chassis 1 via a spring/absorber arrangement 2 are recognized at first. The chassis shall represent the front area of the chassis 1 of a truck, while the indicated mass body represents the driver's cab 3 of the truck. The direction of travel 4 extends obliquely out of the drawing plane.

It can be recognized from FIG. 1 that the connection between the driver's cab 3 and the chassis 1 comprises, besides four spring/absorber arrangements 2, two longitudinal control arms 5 arranged in the front area of the driver's cab as well as a scissor pantograph 6 arranged in the rear area of the driver's cab. The longitudinal control arms 5, which are indicated highly schematically only and extend in reality essentially horizontally rather than obliquely upwardly, are used primarily to support longitudinal forces between the driver's cab 3 and the chassis 1. Especially the strong longitudinal forces occurring in case of a possible crash can be reliably controlled thanks to the longitudinal control arms 5 and transmitted between the chassis 1 and the driver's cab 3. However, the longitudinal control arms 5 may also be designed such that they additionally make possible a certain roll stabilization in the front area of the driver's cab 3.

Figure 2:
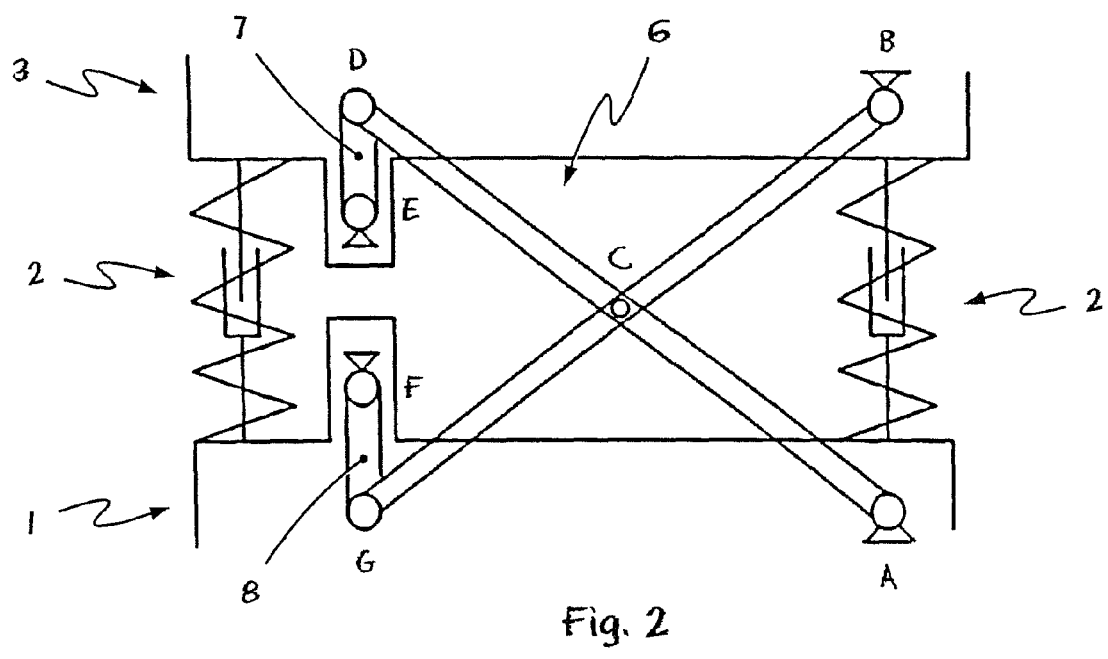
FIG. 2 is a side view of the scissor pantograph of the suspension arrangement according to FIG. 1 in a view corresponding to FIG. 1.

The scissor pantograph 6, which connects the driver's cab 3 and the chassis 1, can be recognized in the rear area of the driver's cab 3, and it is shown on an even larger scale in FIG. 2 in the rear view relative to the driver's cab 3. It is recognized from FIG. 2 that the scissor pantograph 6 comprises seven joints, which are designated by the letters A, B, C, D, E, F and G. Of the joints A through G, joints A and F are rigidly connected to the frame, whereas B and E are rigidly connected to the driver's cab.

The scissors pantograph includes first and second crossed linkages each having first and second end joints A, B, D, and G. The first end A of the first linkage is pivotally connected to the chassis 1 and the second end D of the first linkage is pivotally connected to the mass body/driver's cab 3. The first end B of the second linkage is pivotally connected to the mass body/driver's cab and the second end G of the second linkage is pivotally connected to the chassis 1. The first and second linkages are also pivotally connected at joint C to each other between their first and second end joints. A first oscillating lever 7 connects the second end D of the first lever to the mass body 3, while a second oscillating lever 8 connects the second end G of the second lever to the chassis 1.

Based on the special kinematics of the scissor pantograph according to FIG. 2, the lateral rolling motions of the driver's cab 3 relative to the chassis 1 are supported via the joints A, B, E and F, by which the driver's cab 3 and the chassis 1 are always held in parallel to each other in a first approximation. A relative roll of the driver's cab 3 relative to the chassis 1 does not consequently occur.

The change in the vertical distance between the bearing points D and E as well as G and F, which change is linked with the cosine component of the pivoting motion of the oscillating levers 7 and 8, appears only in case of greater vertical deflections between the driver's cab 3 and the chassis 1 and it brings about a slight, but defined relative rolling motion between the driver's cab 3 and the chassis 1. However, this is practically of no significance, because the vertical relative motion between the driver's cab 3 and the chassis 1 is always only in the range of a few cm to 10 cm, maximum, in a driver's cab mount. The order of magnitude of the change of the vertical distance of the bearing points D and E as well as G and F is thus negligible.

However, static or dynamic lateral forces that occur are transmitted directly via the joints A, C and B between the driver's cab 3 and the chassis 1, so that—at any rate in the area of the scissor pantograph 6, i.e., in the rear area of the driver's cab 3 in this embodiment—no additional lateral guiding or supporting of the driver's cab 1 is necessary. However, the vertical motion between the driver's cab 3 and the chassis remains fully unhindered because of the free vertical mobility of the joint points B and E in relation to the joint points A and F, and it is absorbed or supported, as intended, only by the spring/absorber arrangements 2.

Thus, it becomes clear as a result that the present invention leads to a suspension arrangement for the anti-vibration suspension of a mass body, especially the driver's cab of a truck, with which the intended degree of freedom of motion of the mass body can be set reliably with a robust design, and undesired motions along other directions in space are at the same time effectively absorbed or suppressed. The present invention thus makes possible the reliable and comfortable antivibration suspension especially of vehicle cabs and the like with low maintenance and at a low cost.

Thus, the present invention makes an important contribution to the improvement of safety and reliability especially in the area of truck technology, especially in case of applications in which economic considerations and cost reduction play a role, along with high quality requirements.

While specific embodiments of the invention have been shown and described in detail to illustrate the application of the principles of the invention, it will be understood that the invention may be embodied otherwise without departing from such principles.

APPENDIX

List of Reference Numbers

1 Chassis
2 Spring/absorber arrangement
3 Mass body, driver's cab
4 Direction of travel
5 Longitudinal control arm
6 Scissor pantograph
7, 8 Oscillating lever
A through G Joints

The invention claimed is:

1. A suspension arrangement for the antivibration suspension of a mass body relative to a chassis, the suspension arrangement comprising:
   a spring/absorber arrangement arranged between the mass body and the chassis for absorbing shocks and vibrations;
   at least one scissor pantograph for reducing degrees of freedom of motion of the mass body, said scissor pantograph including one movable bearing arrangement designed as an oscillating lever.

2. A suspension arrangement in accordance with claim 1, wherein:
   said scissor pantograph includes bearing arrangements designed as an elastomer bearing.

3. A suspension arrangement in accordance with claim 1, further comprising:
   another scissor pantograph.

4. A suspension arrangement in accordance with claim 3, wherein:
   a plane spanned by joints of said scissor pantograph is arranged at substantially right angles to a plane spanned by joints of said another scissor pantograph.

5. A suspension arrangement in accordance with claim 1, further comprising:
   at least one control arm arranged at right angles to a said plane spanned by joints of said scissor pantograph.

6. A suspension arrangement in accordance with claim 1, wherein:
   the suspension arrangement is designed as a modular system comprising bars and joints.

7. A suspension arrangement between a chassis and a mass body, the arrangement comprising:

a spring/absorber device arranged between the mass body and the chassis for absorbing shocks and vibrations in a first direction, said first direction being in a direction of the mass body toward and away from the chassis;

a scissor pantograph movably connecting the chassis to the mass body in said first direction, and blocking relative movement between the chassis and the mass body in a second direction, said second direction being substantially perpendicular to said first direction.

8. An arrangement in accordance with claim 7, wherein: said scissors pantograph includes first and second crossed linkages, diametrically opposite ends of said linkages being pivotally connected to one of the mass body and the chassis, said linkages also being pivotally connected to each other between said ends.

9. An arrangement in accordance with claim 7, wherein: said scissor pantograph includes first and second linkages each having first and second ends, said first end of said first linkage being pivotally connected to the chassis and said second end of said first linkage being pivotally connected to the mass body, said first end of said second linkage being pivotally connected to the mass body and said second end of said second linkage being pivotally connected to the chassis, said first and second linkages also being pivotally connected to each other between said first and second ends.

10. An arrangement in accordance with claim 9, wherein: a first oscillating lever connects said second end of said first lever to the mass body;
a second oscillating lever connects said second end of said second lever to the chassis.

11. An arrangement in accordance with claim 7, wherein: said scissors pantograph blocks rotation of the mass body with respect to the chassis.

12. A suspension arrangement for the antivibration suspension of a mass body relative to a chassis, the suspension arrangement comprising:
a spring/absorber arrangement arranged between the mass body and the chassis for absorbing shocks and vibrations;
at least one scissor pantograph for reducing degrees of freedom of motion of the mass body, said scissor pantograph including bearing arrangements designed as an elastomer bearing.

13. A suspension arrangement for the antivibration suspension of a mass body relative to a chassis, the suspension arrangement comprising:
a spring/absorber arrangement arranged between the mass body and the chassis for absorbing shocks and vibrations;
at least one scissor pantograph for reducing degrees of freedom of motion of the mass body;
another scissor pantograph;
a plane spanned by joints of said scissor pantograph is arranged at substantially right angles to a plane spanned by joints of said another scissor pantograph.

14. A suspension arrangement for the antivibration suspension of a mass body relative to a chassis, the suspension arrangement comprising:
a spring/absorber arrangement arranged between the mass body and the chassis for absorbing shocks and vibrations;
at least one scissor pantograph for reducing degrees of freedom of motion of the mass body;
at least one control arm arranged at right angles to a said plane spanned by joints of said scissor pantograph.

15. A suspension arrangement between a chassis and a mass body, the arrangement comprising:
a spring/absorber device arranged between the mass body and the chassis for absorbing shocks and vibrations in a first direction;
a scissor pantograph movably connecting the chassis to the mass body in said first direction, and blocking relative movement between the chassis and the mass body in a second direction, said scissors pantograph including first and second linkages each having first and second ends, said first end of said first linkage being pivotally connected to the chassis and said second end of said first linkage being pivotally connected to the mass body, said first end of said second linkage being pivotally connected to the mass body and said second end of said second linkage being pivotally connected to the chassis, said first and second linkages also being pivotally connected to each other between said first and second ends;
a first oscillating lever connecting said second end of said first lever to the mass body;
a second oscillating lever connecting said second end of said second lever to the chassis.

* * * * *